United States Patent
Wang et al.

(10) Patent No.: US 10,231,245 B1
(45) Date of Patent: Mar. 12, 2019

(54) OBTAINING A SPECTRUM ALLOCATION IN A SELF-ORGANIZING NETWORK

(71) Applicant: Google Inc., Mountain View, CA (US)

(72) Inventors: Jibing Wang, Saratoga, CA (US); Yi Hsuan, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/715,957

(22) Filed: Sep. 26, 2017

Related U.S. Application Data

(60) Provisional application No. 62/400,294, filed on Sep. 27, 2016.

(51) Int. Cl.
| | | |
|---|---|---|
| *H04W 72/06* | (2009.01) | |
| *H04W 72/08* | (2009.01) | |
| *H04W 72/04* | (2009.01) | |
| *H04W 48/20* | (2009.01) | |
| *H04W 24/02* | (2009.01) | |

(52) U.S. Cl.
CPC ......... *H04W 72/06* (2013.01); *H04W 72/046* (2013.01); *H04W 72/085* (2013.01); *H04W 24/02* (2013.01); *H04W 48/20* (2013.01)

(58) Field of Classification Search
CPC ..... H04W 16/10; H04W 16/14; H04W 16/18; H04W 72/06; H04W 72/085; H04W 72/046; H04W 72/20; H04W 72/02; H04L 5/003; H04L 5/0032; H04L 5/0037; H04L 5/0042; H04L 5/0044; H04M 1/72505

See application file for complete search history.

(56) References Cited

U.S. PATENT DOCUMENTS

| | | | |
|---|---|---|---|
| 5,850,592 A | 12/1998 | Ramanathan | |
| 2007/0281710 A1* | 12/2007 | Bai | H04W 16/10 455/452.1 |
| 2010/0232318 A1 | 9/2010 | Sarkar | |
| 2011/0151886 A1* | 6/2011 | Grayson | H04W 16/04 455/452.1 |
| 2011/0280194 A1* | 11/2011 | Schmidt | H04W 72/02 370/329 |

(Continued)

OTHER PUBLICATIONS

Lopez-Perez, David, et al. "Dynamic Downlink Frequency and Power Allocation in OFDMA Cellular Networks." IEEE transactions on communications, vol. 60, No. 10, pp. 2904-2914, Oct. 2012.

*Primary Examiner* — Jean A Gelin
(74) *Attorney, Agent, or Firm* — McDermott Will & Emery LLP

(57) ABSTRACT

Systems and method are disclosed for obtaining an allocation of spectrum for a wireless access point in a self-organized network. The desirability of available wireless communication channels are ranked and the highest ranked wireless communication channel is initially selected. A request to a spectrum access system is made requesting allocation of the selected channel at a maximum power level. In response to receiving a denial of the request for allocation at the maximum power level, a request is transmitted to the spectrum allocation authority is requesting allocation of the selected channel at a minimum acceptable power level. In response to receiving a grant of an allocation of the selected channel at the minimum acceptable power level, a search is initiated with the spectrum allocation authority for a highest allocable power level for the selected channel.

20 Claims, 3 Drawing Sheets

(56) References Cited

U.S. PATENT DOCUMENTS

| | | | | |
|---|---|---|---|---|
| 2013/0165134 A1* | 6/2013 | Touag | ............... | H04W 72/0486 |
| | | | | 455/452.1 |
| 2014/0090003 A1* | 3/2014 | Eguchi | ................ | H04L 65/4076 |
| | | | | 725/116 |
| 2014/0328194 A1* | 11/2014 | Sen | ...................... | H04W 72/082 |
| | | | | 370/252 |
| 2015/0223069 A1* | 8/2015 | Solondz | ................ | H04W 12/08 |
| | | | | 370/329 |
| 2016/0183264 A1* | 6/2016 | Rasmussen | ....... | H04W 72/0453 |
| | | | | 370/330 |
| 2016/0286425 A1* | 9/2016 | Gormley | ............. | H04W 28/021 |
| 2016/0330743 A1* | 11/2016 | Das | ....................... | H04W 76/10 |

* cited by examiner

OBTAINING A SPECTRUM ALLOCATION IN A SELF-ORGANIZING NETWORK

RELATED APPLICATIONS

The present application claims priority to, and the benefit of, U.S. Provisional Patent Application No. 62/400,294, titled "SYSTEMS AND METHODS FOR OBTAINING A SPECTRUM ALLOCATION IN A SELF-ORGANIZING NETWORK," and filed Sep. 27, 2016, the entire contents of which are hereby incorporated by reference.

BACKGROUND OF THE INVENTION

The United States Federal Communications Commission (FCC) has opened up spectrum in the Citizens Band Radio Service (CBRS) for use by additional users. Use of the CBRS frequency range from 3550-3700 MHz will be governed by a three-tier allocation process, providing protected access to Federal incumbent users in a first tier, access to holders of Priority Access Licenses (PAL) in a second tier, and finally General Authorized Access (GAA) to the general public and service providers in a third tier. The incumbent users have the highest level of protection against interference. PAL holders are protected from interference from GAA users. GAA usage is unprotected. A spectrum access system (SAS) will grant access points to portions of the spectrum, or channels, to use in accordance with the tiered system. Channel usage will be granted for use at various power levels to help reduce or prevent interference with other access points in the vicinity. Particularly for GAA users, the allocation of spectrum will likely be dynamic, with different channels within the spectrum being granted at different power levels at different times depending on the real-time demand for the spectrum.

SUMMARY OF THE INVENTION

According to one aspect, the disclosure pertains to a method of obtaining an allocation of spectrum for a wireless access point in a self-organized network. The method includes ranking, by a processor, the desirability of a list of available wireless communication channels and selecting, by the processor, a highest ranked wireless communication channel. The method further includes transmitting, by the processor, a request to a spectrum access system requesting allocation of the selected channel at a maximum power level. In response to the processor receiving a denial of the request for allocation at the maximum power level, the processor transmits a request to the spectrum allocation authority requesting allocation of the selected channel at a minimum acceptable power level. In response to the processor receiving a notification of a grant of an allocation of the selected channel at the minimum acceptable power level, the processor initiates a search with the spectrum allocation authority for a highest allocable power level for the selected channel, and operates the wireless access point at the highest allocable power level identified in the search. In some implementations, the search is a binary search. In some implementations, the list of available wireless communication channels are within the Citizens Band Radio Service (CBRS) band of the radio spectrum. In some implementations, the wireless access point comprises an LTE eNodeB.

In some implementations, in response to the processor receiving a denial of an allocation of the selected channel at the minimum acceptable power level, the method includes selecting a next-highest ranked channel, and transmitting a request to the spectrum access system to allocate the selected next-highest ranked channel at a maximum power level. In some implementations, in response to the processor receiving a grant of an allocation to the selected channel at the maximum power level, the method also includes causing the wireless access point to operate over the selected channel at the maximum power level. In some implementations, the processor ranks the desirability of the list of available wireless communication channels based on an interference-based cost function. In some implementations, the processor ranks the desirability of the list of available wireless communication channels in sets of channels, selects a group of channels based on the ranking, and requests an allocation from the spectrum access system to the group of selected channels for use with an LTE carrier aggregation feature. In some implementations, the selected group of channels includes a contiguous group of channels. In some implementations, the selected group of channels includes at least two non-contiguous channels.

According to another aspect, the disclosure pertains to a non-transitory computer readable medium storing computer executable instructions. The instructions, which, when executed by a processor, cause the processor to perform operations including ranking, by a processor, the desirability of a list of available wireless communication channels and selecting, by the processor, a highest ranked wireless communication channel. The instructions further cause the processor to perform operations including transmitting, by the processor, a request to a spectrum access system requesting allocation of the selected channel at a maximum power level. In response to the processor receiving a denial of the request for allocation at the maximum power level, the processor transmits a request to the spectrum allocation authority requesting allocation of the selected channel at a minimum acceptable power level. In response to the processor receiving a notification of a grant of an allocation of the selected channel at the minimum acceptable power level, the processor initiates a search with the spectrum allocation authority for a highest allocable power level for the selected channel, and operates the wireless access point at the highest allocable power level identified in the search. In some implementations, the search is a binary search. In some implementations, the list of available wireless communication channels are within the Citizens Band Radio Service (CBRS) band of the radio spectrum. In some implementations, the wireless access point comprises an LTE eNodeB.

In some implementations, in response to the processor receiving a denial of an allocation of the selected channel at the minimum acceptable power level, the instructions further cause the processor to further cause the processor to perform operations including selecting a next-highest ranked channel, and transmitting a request to the spectrum access system to allocate the selected next-highest ranked channel at a maximum power level. In some implementations, in response to the processor receiving a grant of an allocation to the selected channel at the maximum power level, the instructions further cause the processor to perform operations including causing the wireless access point to operate over the selected channel at the maximum power level. In some implementations, the processor ranks the desirability of the list of available wireless communication channels based on an interference-based cost function. In some implementations, the processor ranks the desirability of the list of available wireless communication channels in sets of channels, selects a group of channels based on the ranking, and requests an allocation from the spectrum access system to the group of selected channels for use with an LTE carrier aggregation feature. In some implementations, the selected group of channels includes a contiguous group of channels. In some implementations, the selected group of channels includes at least two non-contiguous channels.

According to another aspect, the disclosure pertains to a wireless access point. The wireless access point includes a processor and a memory, coupled to the processor, storing instructions which, when executed by the processor, cause the processor to rank the desirability of a list of available wireless communication channels and select a highest ranked wireless communication channel. The instructions further cause the processor to transmit a request to a spectrum access system requesting allocation of the selected channel at a maximum power level. In response to the processor receiving a denial of the request for allocation at the maximum power level, the processor transmits a request to the spectrum allocation authority requesting allocation of the selected channel at a minimum acceptable power level. In response to the processor receiving a notification of a grant of an allocation of the selected channel at the minimum acceptable power level, the processor initiates a search with the spectrum allocation authority for a highest allocable power level for the selected channel, and operates the wireless access point at the highest allocable power level identified in the search. In some implementations, the search is a binary search. In some implementations, the list of available wireless communication channels are within the Citizens Band Radio Service (CBRS) band of the radio spectrum. In some implementations, the wireless access point comprises an LTE eNodeB.

In some implementations, in response to the processor receiving a denial of an allocation of the selected channel at the minimum acceptable power level, the instructions stored in the memory on the wireless access point further cause the processor to select a next-highest ranked channel, and transmit a request to the spectrum access system to allocate the selected next-highest ranked channel at a maximum power level. In some implementations, in response to the processor receiving a grant of an allocation to the selected channel at the maximum power level, the instructions stored in the memory on the wireless access point further cause the wireless access point to operate over the selected channel at the maximum power level. In some implementations, the processor ranks the desirability of the list of available wireless communication channels based on an interference-based cost function. In some implementations, the processor ranks the desirability of the list of available wireless communication channels in sets of channels, selects a group of channels based on the ranking, and requests an allocation from the spectrum access system to the group of selected channels for use with an LTE carrier aggregation feature. In some implementations, the selected group of channels includes a contiguous group of channels. In some implementations, the selected group of channels includes at least two non-contiguous channels.

BRIEF DESCRIPTION OF THE DRAWINGS

The foregoing will be apparent from the following more particular description of example implementations of the invention, as illustrated in the accompanying drawings. The drawings are not necessarily to scale, emphasis instead being placed upon illustrating implementations of the present invention.

DETAILED DESCRIPTION

Given the dynamic nature of spectrum allocation, it is desirable for access points to gain access in a manner that avoids wasting bandwidth through less optimal allocation of bandwidth. Accordingly, systems and methods are disclosed herein for an access point, such as and Long Term Evolution (LTE) eNodeB, to efficiently obtain an improved performance channel allocation within the CBRS band. While the spectrum access systems and methods discussed herein are discussed in the context of usage of the CBRS spectrum and eNodeB access points, a person of ordinary skill in the art would appreciate that they could also be applied to eNodeB access points or other access points attempting to obtain a spectrum allocation in other portions of the electromagnetic spectrum.

Figure 1:
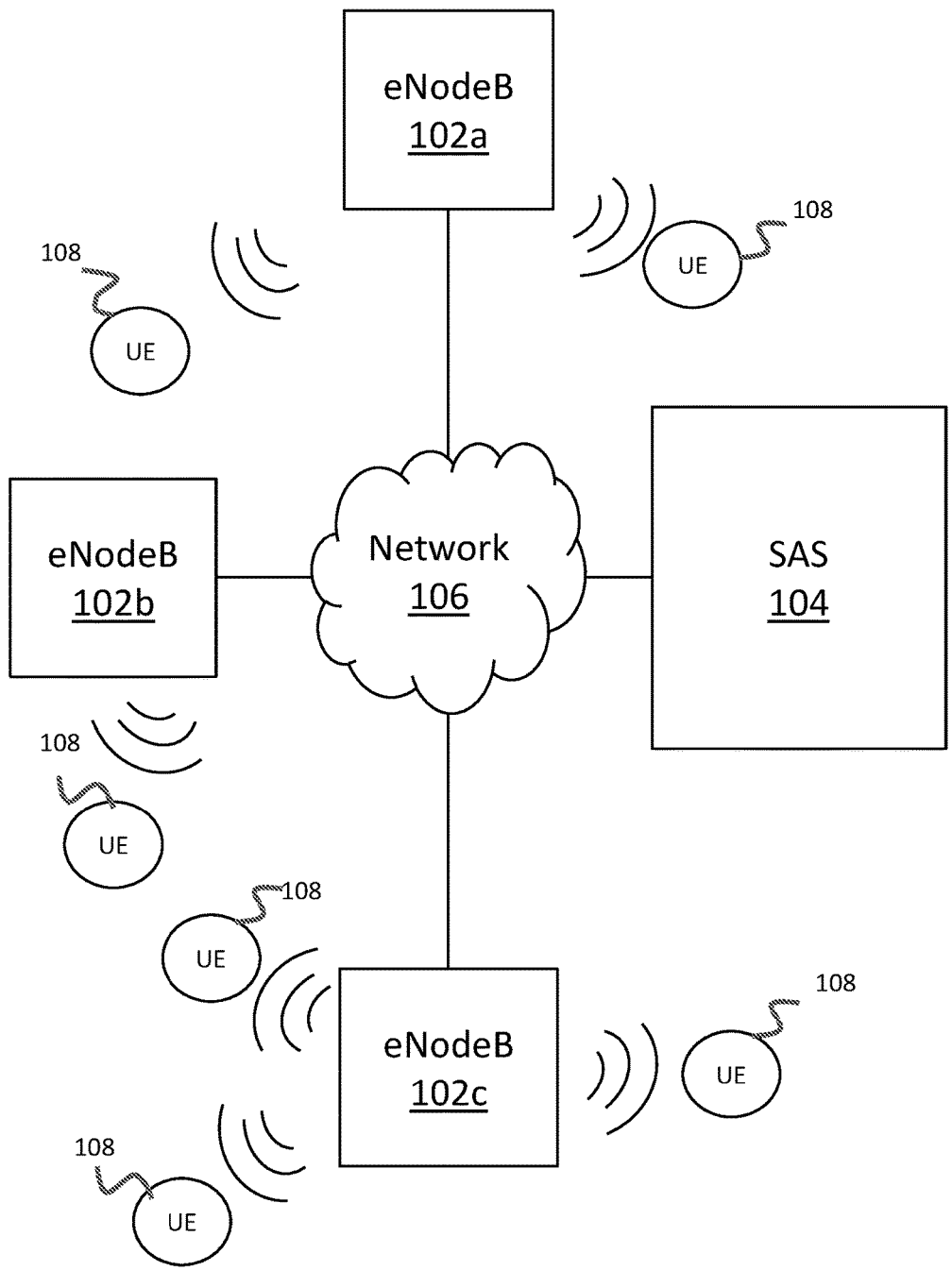
FIG. 1 shows a block diagram of a portion of an example wireless network 100 operating in the CBRS band.

FIG. 1 shows a block diagram of a portion of an example wireless network 100 operating in the CBRS band. The example network includes three eNodeBs 102a-102c (generally referred to as eNodeBs 102), a SAS 104, and several pieces of user equipment (referred to as UEs 108). The eNodeBs 102 are connected to the SAS 104 via a network 106, such as the Internet or any other public or private network. In some implementations, the eNodeBs may communicate with the SAS 104 via an SAS proxy (not shown). The SAS proxy then communicates with the SAS 104 on behalf of the eNodeB 102. While only three eNodeBs 102 are shown for illustrative purposes, a person of ordinary skill in the art will understand that a SAS 104 may serve a much larger number of eNodeBs 102 and other access points. In some implementations, a single SAS 104 may serve a large geographic area, such as a city, state, region, or even the entire United States.

The SAS 104 responds to requests for access to channels within the spectrum, by either granting the request or denying the request. The request typically includes an identification of a channel within the CBRS spectrum, as well as a power level the access point making the request wishes to use. The SAS 104 determines whether to grant the request based on whether doing so would result in interference with communications at access points previously granted access to the same or an overlapping channel.

In some implementations, one or more eNodeBs 102 can implement carrier aggregation (CA) communication, in which the eNodeB 102 operates across multiple adjacent channels. In such implementations, the eNodeB 102 can send a request to the SAS 104 seeking permission to use multiple channels or frequency ranges. In some such implementations, the eNodeB 102 can request, and the SAS 104 can only grant, access to all requested channels at the same power level. In some other implementations, an eNodeB 102 can request usage of adjacent channels at different power levels, either in a single request, or by request access to adjacent channels in different channel access requests.

Figure 2:
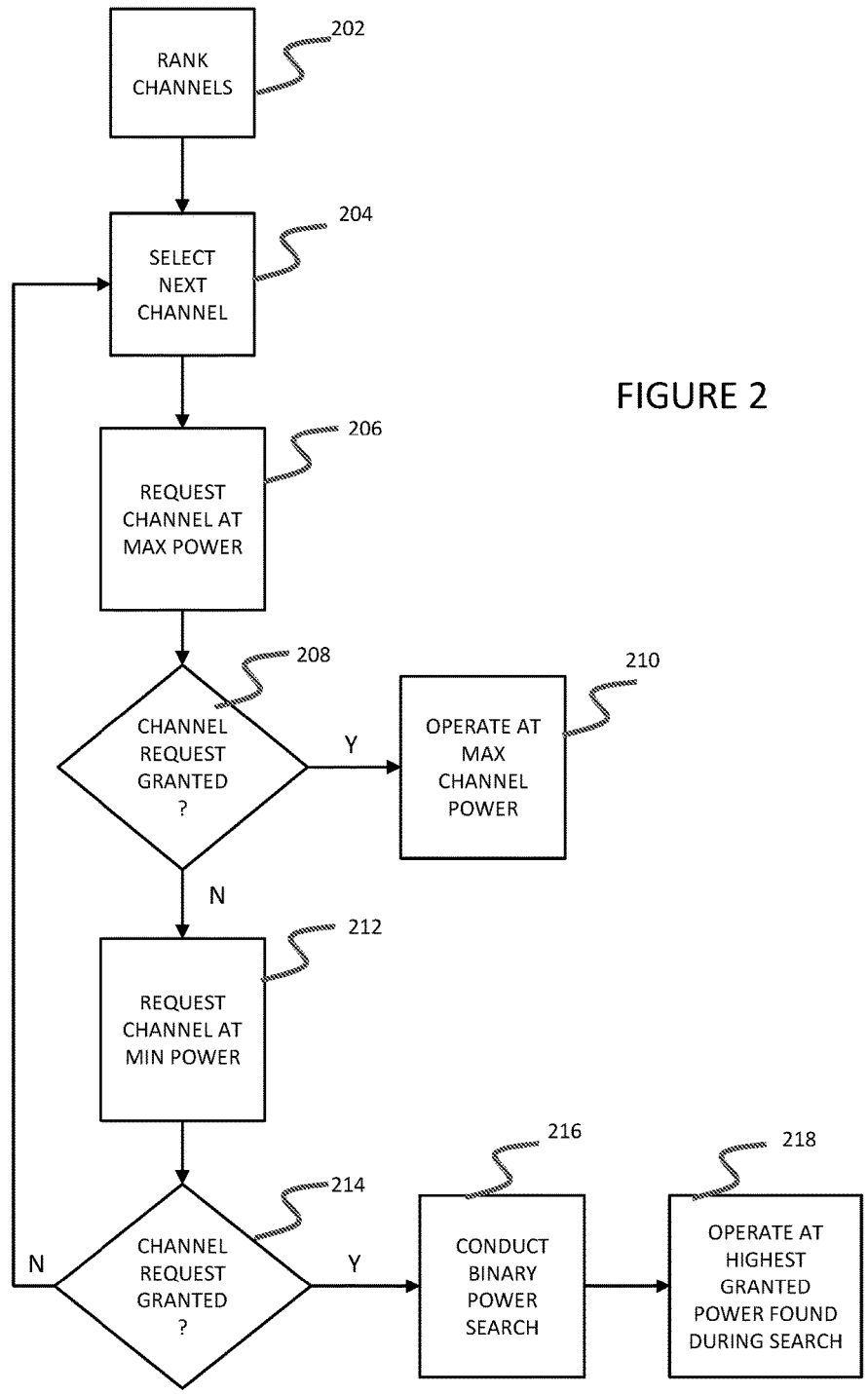
FIG. 2 shows a block diagram of a method 200 for obtaining allocation of spectrum in a CBRS band network.

FIG. 2 shows a block diagram of a method 200 for obtaining allocation of spectrum in a CBRS band network. The method 200 can be carried out by a computer processor, such as a general purpose processor or special purpose processor of an eNodeB (such as one of the eNodeBs 102 shown in FIG. 1), by executing computer executable instructions stored in computer memory or some other form of non-transitory computer readable medium. In some other implementations, the method 200 can be carried out by a processor included in a Network Management System supporting the LTE network to which the eNodeB belongs. In some implementations, the method 200 can be carried out by an access point, other than an LTE eNodeB, seeking allocation of spectrum within the CBRS or other frequency band. The methodology can be used for allocation of spectrum in any self-organizing network (SON) in which the channel access is requested by a node and granted by a central allocation system.

The instructions, when executed, cause the processor to rank a list of requestable spectrum channels (stage 202) according to desirability. In various implementations, different criteria can be employed to evaluation the desirability of each requestable channel. In some implementations, for example, channels are ranked based on a cost function. The cost frequency for a frequency channel, in some implementations, can be defined as the co-channel RF interference level from close-by small-cells. Frequencies with higher levels of interference have a higher cost, and therefore are ranked lower in the list. In some other implementations, the processor has access to radio environment measurement (REM) scan results, which can be stored in memory accessible by the processor and/or which can be retrieved from a remote information source. In such examples, the cost of a frequency can be the received signal strength indicator (RSSI) for that frequency—the higher the RSSI at a frequency, the more interference a node communicating on that frequency is likely to experience. Accordingly, frequencies with higher RSSIs are rankled lower and frequencies with lower RSSIs are ranked higher.

After determining ranks for potential frequency channels, the instructions cause the processor to select a next highest ranked channel to request a grant of access (stage 204). In the first iteration of the method 200, the processor selects the highest ranked set. The processor can request allocation of the selected channel at a maximum desired power level (stage 206). If the SAS (such as SAS 104 shown in FIG. 1) grants the request to use the selected channel at the maximum desired power level (decision block 208), the processor causes the eNodeB to operate using the selected channel at the maximum allocated power level (stage 210). If the SAS denies the request to use the selected channel, the processor causes the eNodeB to request access to the selected channel at a power level that is the minimum acceptable power level to the eNodeB for usage of the channel (stage 212). If this minimum power allocation request is granted (decision block 214), the processor causes the eNodeB to initiate a series of additional requests for allocation of the selected channel at varying power levels (stage 216). In some implementations, the eNodeB can perform the series of additional requests according to a binary search process. For, example, the processor transmits a request for an allocation at a power level at the mid-point between the maximum and minimum power levels. If granted, the processor then requests an allocation at a power level equal to the mid-point between the previous request and the maximum request (i.e., a power level at three quarters of the way between the maximum requested power and the minimum requested power), and so forth. The eNodeB then operates at the highest power level that was granted during the binary search (stage 218). In some other implementations, other search processes may be used besides a binary search without departing from the scope of the invention.

If the minimum power channel allocation request is denied (at decision block 214), the processor selects the next most desirable channel in its ranked list (step 204) and seeks allocation of that next selected channel at a maximum desirable power level (step 206). The allocation requests described above can be directly between an access point and an SAS, or they can be through an SAS proxy.

Figure 3:
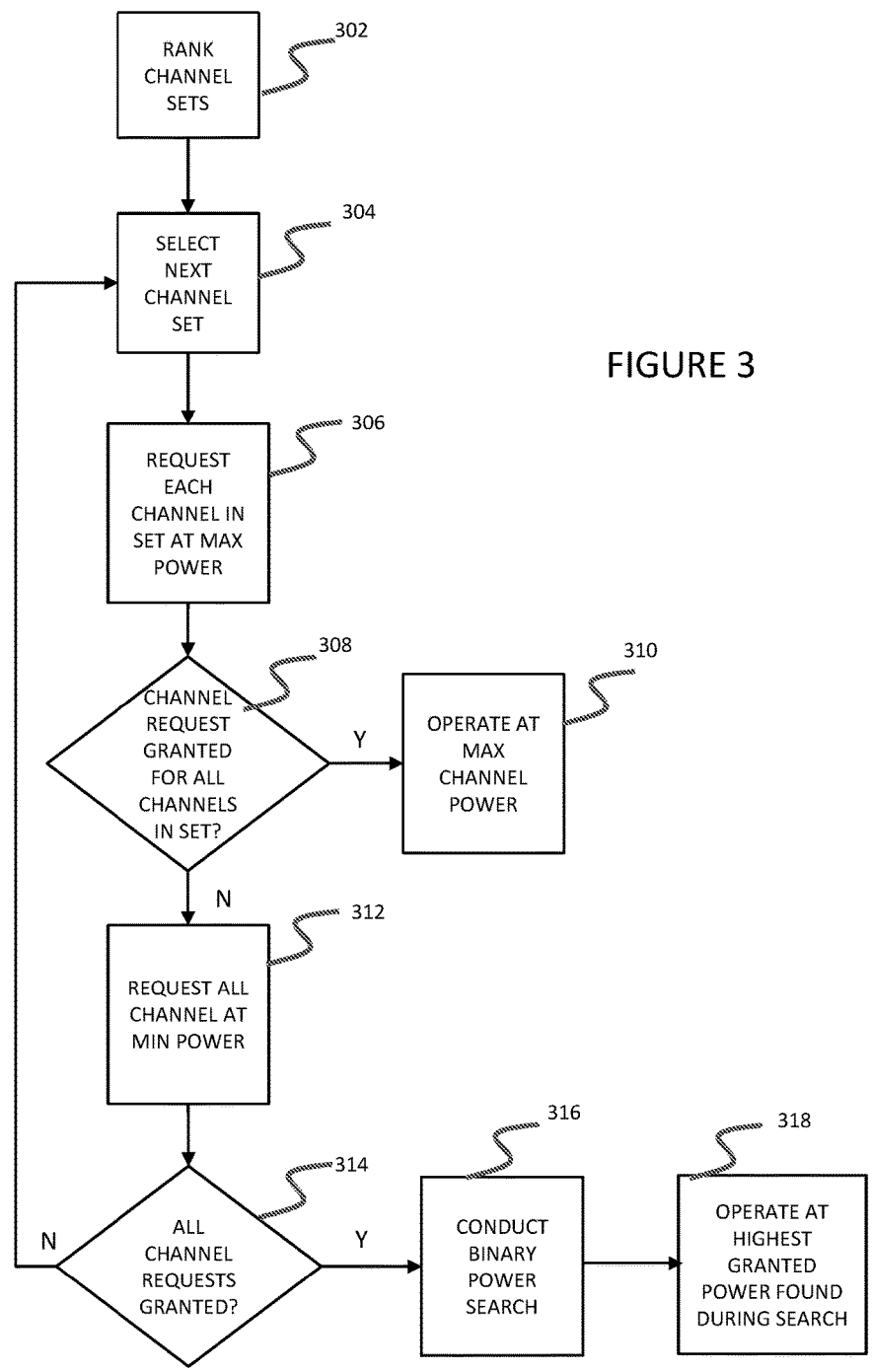
FIG. 3 shows a block diagram of a method 300 for obtaining allocation of spectrum in a CBRS band network according to a carrier aggregation mode of operation.

FIG. 3 shows a block diagram of a method 300 for obtaining allocation of spectrum in a CBRS band network according to a carrier aggregation mode of operation, i.e., where an access point, such as an eNodeB requests allocation of a series of contiguous or non-contiguous channels across which it will spread its communications. As with the method 200, the method 300 can be implemented by a general or special purpose computer executing computer executable instructions stored in a non-transitory computer readable medium, such as computer memory. The processor can be within an access point, such an LTE eNodeB (such as one of the eNodeBs 102 shown in FIG. 1), an LTE Network Management System, or the processor of access point utilizing a communication architecture other than LTE.

The method 300 is similar to the method 200 other than channel allocations are not ranked or requested individually, but instead are ranked and requested as sets of channels. For example, the processor ranks all possible combinations of contiguous and non-contiguous channels according to a cost function (stage 302). In some implementations, the cost function is a function of cost functions for each of the individual channels in the set. For example, the cost function for the set can be the sum of the costs of the individual channels. As described in relation to FIG. 2, suitable channel cost functions include, without limitation, RSSI-based cost functions and close-by small-cell interference-based cost functions. In some implementations, the cost function factors in the number of channels in the set, such that larger sets of channels are not disproportionately undervalued by having one or more high cost channels. For example, in some implementations the cost function can divide the combined costs of the channels in the set of channels by the number of channels in the set, using the average cost of the channels instead of the total cost of the channels as the set cost function.

After the sets of channels are ranked, the processor, in executing the computer executable instructions, selects a next highest ranked set of channels (stage 304) to request a grant of access to. In the first iteration of the method 300, the processor selects the highest ranked set. The processor causes the eNodeB to request access to the set of channels at a maximum desirable power level for each channel (stage 306). In some implementations, the power level request for each channel is the same. If the SAS grants the request (decision block 308), the processor causes the eNodeB to operate using the set of requested channels at the maximum power level (stage 310).

If the SAS denies the request to use the set of channels at the maximum desired power level (decision block 308), the processor causes the eNodeB to request allocation of the set of channels at the minimum acceptable power level for the set of channels (stage 312). If this request is granted (decision block 314), the processor causes the eNodeB to initiate a search for a maximum power level the SAS is willing to grant for the set of channels (stage 316). In some implementations, the eNodeB can perform the series of additional requests according to a binary search process. The processor can cause the eNodeB to operate on those channels at the maximum grantable power level found during the search (stage 318).

If the request to operate using the selected set of channels at a minimum power level is denied (at decision block 314), the processor causes the eNodeB to select the next-highest ranked set of channels and begins the allocation request process (stages 304-318) again, until the eNodeB is granted access to a set of channels at power levels that are acceptable. In some implementations, where access to each channel is requested individually, if any one channel is denied allocation at the minimum power level, the processor considers the request for the full set of channels denied.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

The operations described in this specification can be implemented as operations performed by a data processing apparatus on data stored on one or more computer-readable storage devices or received from other sources.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network. Examples of communication networks include a local area network ("LAN") and a wide area network ("WAN"), an inter-network (e.g., the Internet), and peer-to-peer networks (e.g., ad hoc peer-to-peer networks).

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of obtaining an allocation of spectrum for a wireless access point in a self-organized network, comprising:
    ranking, by a processor, a desirability of a list of available wireless communication channels;
    selecting, by the processor, a highest ranked wireless communication channel;
    transmitting, by the processor, a request to a spectrum access system of a specturm allocation authority requesting allocation of the selected channel at a maximum power level;
    in response to the processor receiving a denial of the request for allocation at the maximum power level, transmitting, by the processor, a request to the spectrum access system requesting allocation of the selected channel at a minimum acceptable power level; and
    in response to the processor receiving a notification of a grant of an allocation of the selected channel at the minimum acceptable power level, initiating, by the processor, a search with the spectrum access system for a highest allocable power level for the selected channel, and operating the wireless access point at the highest allocable power level identified in the search.

2. The method of claim 1, wherein the search comprises a binary search.

3. The method of claim 1, wherein the list of available wireless communication channels are within a Citizens Band Radio Service (CBRS) band of the radio spectrum.

4. The method of claim 1, wherein the wireless access point comprises an LTE eNodeB.

5. The method of claim 1, further comprising, in response to the processor receiving a denial of an allocation of the selected channel at the minimum acceptable power level, selecting, by the processor, a next-highest ranked channel, and transmitting by the processor, a request to the spectrum access system to allocate the selected next-highest ranked channel at a maximum power level.

6. The method of claim 1, further comprising, in response to the processor receiving a grant of an allocation to the selected channel at the maximum power level, causing the wireless access point to operate over the selected channel at the maximum power level.

7. The method of claim 1, wherein the processor ranks the desirability of the list of available wireless communication channels based on an interference-based cost function.

8. The method of claim 1, wherein the processor ranks the desirability of the list of available wireless communication channels in sets of channels, selects a group of channels based on the ranking, and requests an allocation from the spectrum access system to the group of selected channels for use with an LTE carrier aggregation feature.

9. The method of claim 8, wherein the selected group of channels includes a contiguous group of channels.

10. The method of claim 8, wherein the selected group of channels includes at least two non-contiguous channels.

11. A non-transitory computer readable medium storing computer executable instructions, which, when executed by a processor, cause the processor to perform operations comprising:
 ranking, by the processor, a desirability of a list of available wireless communication channels;
 selecting, by the processor, a highest ranked wireless communication channel;
 transmitting, by the processor, a request to a spectrum access system of a spectrum allocation authority requesting allocation of the selected channel at a maximum power level;
 in response to the processor receiving a denial of the request for allocation at the maximum power level, transmitting, by the processor, a request to the spectrum access system requesting allocation of the selected channel at a minimum acceptable power level; and
 in response to the processor receiving a notification of a grant of an allocation of the selected channel at the minimum acceptable power level, initiating, by the processor, a search with the spectrum access system for a highest allocable power level for the selected channel, and operating the wireless access point at the highest allocable power level identified in the search.

12. The non-transitory computer readable medium of claim 11, wherein the search comprises a binary search.

13. The non-transitory computer readable medium of claim 11, wherein the list of available wireless communication channels are within a Citizens Band Radio Service (CBRS) band of the radio spectrum.

14. The non-transitory computer readable medium of claim 11, wherein the wireless access point comprises an LTE eNodeB.

15. The non-transitory computer readable medium of claim 11, the operations comprising:
 selecting, in response to the processor receiving a denial of an allocation of the selected channel at the minimum acceptable power level, a next-highest ranked channel, and transmitting a request to the spectrum access system to allocate the selected next-highest ranked channel at a maximum power level.

16. The non-transitory computer readable medium of claim 11, the operations comprising:
 causing the wireless access point to operate over the selected channel at the maximum power level in response to the processor receiving a grant of an allocation to the selected channel at the maximum power level.

17. The non-transitory computer readable medium of claim 11, wherein the processor ranks the desirability of the list of the available wireless communication channels based on an interference-based cost function.

18. The non-transitory computer readable medium of claim 11, wherein the processor ranks the desirability of the list of available wireless communication channels in sets of channels, selects a group of channels based on the ranking, and requests an allocation from the spectrum access system to the group of selected channels for use with an LTE carrier aggregation feature.

19. The non-transitory computer readable medium of claim 18, wherein the selected group of channels includes a contiguous group of channels.

20. The non-transitory computer readable medium of claim 18, wherein the selected group of channels includes at least two non-contiguous channels.

* * * * *